United States Patent
Avny et al.

(10) Patent No.: US 6,382,382 B1
(45) Date of Patent: May 7, 2002

(54) CENTRIFUGALLY BALANCED, PRESSURE-OPERATED CLUTCH ASSEMBLY

(75) Inventors: Eli Avny, Ann Arbor; Steven Gerald Thomas, Bloomfield Hills; Ronald Thomas Cowan, Rochester Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/696,124

(22) Filed: Oct. 25, 2000

(51) Int. Cl.[7] .................... F16D 25/10; F16D 25/12
(52) U.S. Cl. ............... 192/106 F; 192/85 AA; 192/87.11
(58) Field of Search ............. 192/85 AA, 87.11, 192/106 F; 475/146

(56) References Cited

U.S. PATENT DOCUMENTS

| | | | |
|---|---|---|---|
| 3,213,983 A | * 10/1965 | Smirl et al. | 192/3.3 |
| 4,732,253 A | * 3/1988 | Hiramatsu et al. | 192/87.11 |
| 4,741,422 A | * 5/1988 | Fuehrer et al. | 192/87.11 |
| 4,957,195 A | * 9/1990 | Kano et al. | 192/106 F |
| 5,039,305 A | 8/1991 | Pierce | |
| 5,203,749 A | * 4/1993 | Ito | 475/204 |
| 5,514,047 A | 5/1996 | Tibbles et al. | |
| 5,887,690 A | * 3/1999 | Haupt | 192/87.11 |

* cited by examiner

Primary Examiner—Richard M. Lorence
(74) Attorney, Agent, or Firm—Frank G. McKenzie

(57) ABSTRACT

A rotary clutch assembly for a geared power transmission mechanism comprising a friction disc clutch with driving and driven friction clutch plates, the driving plates being connected to a torque input element of the clutch assembly and the driven plates being connected to a torque output element of the clutch assembly, the clutch assembly providing a torque flow path to multiple-ratio gearing, a pressure actuator comprising first and second annular cylinder members and a movable piston member located in one of the cylinder members and cooperating with each member to define a pressure release chamber and a pressure apply chamber, the second clutch member being held axially fast on a torque input shaft for the transmission, the geometry of the cylinder members and the movable piston being sized to effect a centrifugal balance so that the clutch gain is essentially determined by the clutch commanded pressure to produce a relatively speed-independent net clutch-apply force, regardless of clutch cylinder speed.

6 Claims, 3 Drawing Sheets

CENTRIFUGALLY BALANCED, PRESSURE-OPERATED CLUTCH ASSEMBLY

TECHNICAL FIELD

The invention relates to pressure-operated rotary clutches for use in a geared power transmission mechanism.

BACKGROUND ART

Automatic transmissions for use in contemporary vehicles typically include multiple-ratio gearing that defines plural torque flow paths between the vehicle engine and the vehicle traction wheels. The torque input shaft for the gearing is connected to the engine. A hydrokinetic torque converter may establish the connection. The impeller of the torque converter is connected to the engine crankshaft, and the turbine of the torque converter is connected to a torque input element of the gearing. Relative motion of the elements of the gearing is controlled by fluid pressure-operated rotary clutches and brakes.

The rotary clutches, which establish and disestablish torque flow paths through the gearing, include an annular cylinder connected to the torque input element of the gearing and an annular piston received in the cylinder. The cylinder and the piston define an annular pressure chamber which, when pressurized with a command pressure, establishes a piston force that frictionally engages clutch discs to effect torque distribution from the torque input element to the gearing.

The rotation of the clutch and piston assembly creates a centrifugal pressure in the annular pressure chamber. When a clutch control pressure is applied to the annular pressure chamber to effect a desired clutch torque-carrying capacity, the centrifugal pressure developed in the pressure chamber must be offset so that an accurate correlation can be established between the commanded pressure and the clutch torque-carrying capacity.

It is known design practice to provide an annular fluid dam in the rotating clutch and piston assembly and to supply the annular fluid dam with lubricating oil, which rotates in unison with the clutch cylinder. The lubricating oil, as in the case of the fluid in the clutch pressure chamber, is subjected to centrifugal pressure. That centrifugal pressure tends to establish a centrifugal pressure force that opposes the centrifugal pressure force established in the clutch pressure chamber. The net clutch apply force then is approximately equal to the force created by the commanded pressure force.

Another design technique for compensating for the effect of centrifugal pressure buildup in a rotating clutch assembly involves the use of a ball check valve assembly in the annular cylinder, which is closed when the annular cylinder is pressurized but which opens under the effect of centrifugal force due to the mass of a ball check valve element when the cylinder is depressurized as residual fluid in the cylinder is exhausted.

Each of these prior art designs presents undesirable performance consequences. The use of an annular lubricating fluid dam, for example, requires an increase in the axial dimension of the rotating clutch assembly as well as fluid feed passage structure that is dedicated to the supply of lubricating oil to the fluid dam. In the case of a ball check valve assembly that relieves pressure from the clutch assembly, a clutch apply delay following a command for clutch application may present an unacceptable control problem. Further, the fluid displaced through the ball check valve assembly when the clutch is released must be replaced when the clutch is reapplied, thereby introducing a design variable that must be accounted for in the clutch application and release control strategy.

DISCLOSURE OF INVENTION

It is an objective of the invention to provide a rotary clutch assembly with a centrifugally-balanced piston without the need for using a ball check valve assembly or a rotary fluid dam, as in the case of prior art constructions. It includes a rotary clutch cylinder that cooperates with a clutch piston to define a pressure release chamber and a pressure apply chamber that provide essentially complete centrifugal balance.

The entire clutch assembly, as well as the friction elements of the clutch, are subjected to rotation. The clutch piston and the cooperating cylinder define dual piston areas, which permits development of a large gain with a single clutch in a given gear ratio, thus increasing the packaging efficiency of the gearing and the clutch assembly in a transmission environment. The fluid in the rotating cylinder assembly is subjected to centrifugal loads, creating a pressure head. The force created by this pressure head is combined with the other forces acting on the piston.

The dimensions of the pressure-apply chamber and the pressure-release chamber are chosen such that the centrifugal forces are essentially balanced. A dimensional balance coefficient is established for each of the chambers. The effective areas on the piston for the release chamber and for the apply chamber, as well as the dimensions of the release chamber and the apply chamber, are chosen in the rotating clutch assembly of the invention so that the dimensional balance coefficient for one cylinder is equal to the dimensional balance coefficient for the other cylinder. If a relatively large gain is desired, only the apply cylinder is pressurized. If a reduced gain is desired, both chambers are pressurized with a common feed pressure.

A return spring is located in the rotating clutch assembly. The spring force created by the return spring urges the piston to a clutch-release position. The clutch stroke pressure thus can be maintained at a relatively low level because the piston is centrifugally balanced and the spring can be compressed without the necessity for overcoming a centrifugal pressure head in the clutch assembly. This makes it possible to use a low rate spring rather than a very stiff spring.

Since the piston is hydraulically balanced, there is no tendency for a centrifugal pressure to create a clutch actuating force when the piston is rotated at high speeds when clutch application is not commanded. When the clutch pressure is commanded by the transmission control system to establish a torque flow path through the gearing, a reliable commanded force can be established as the clutch apply pressure is compensated for the effect of the net centrifugal force acting in the clutch-release chamber and the clutch-apply chamber. This makes it possible to achieve a constant, speed-independent, net clutch-apply force throughout the entire cylinder speed range. This is accomplished without the necessity for accounting for uncontrollable variables such as seal friction and spring force and for other non-linearities that would be present in a rotary clutch assembly of conventional design.

An embodiment of the invention has a first rotary clutch member that defines an apply pressure cylinder. A clutch-apply piston is in the apply pressure cylinder. An apply pressure chamber is defined by the clutch-apply piston and the apply pressure chamber. The clutch-apply piston and a second rotary clutch member in the clutch-apply piston define a release pressure chamber. The clutch return spring is between the second rotary clutch member and the clutch-apply piston. Each pressure chamber is characterized by a centrifugal pressure balance coefficient, the coefficients being approximately equal.

BEST MODE FOR CARRYING OUT THE INVENTION

Figure 1:
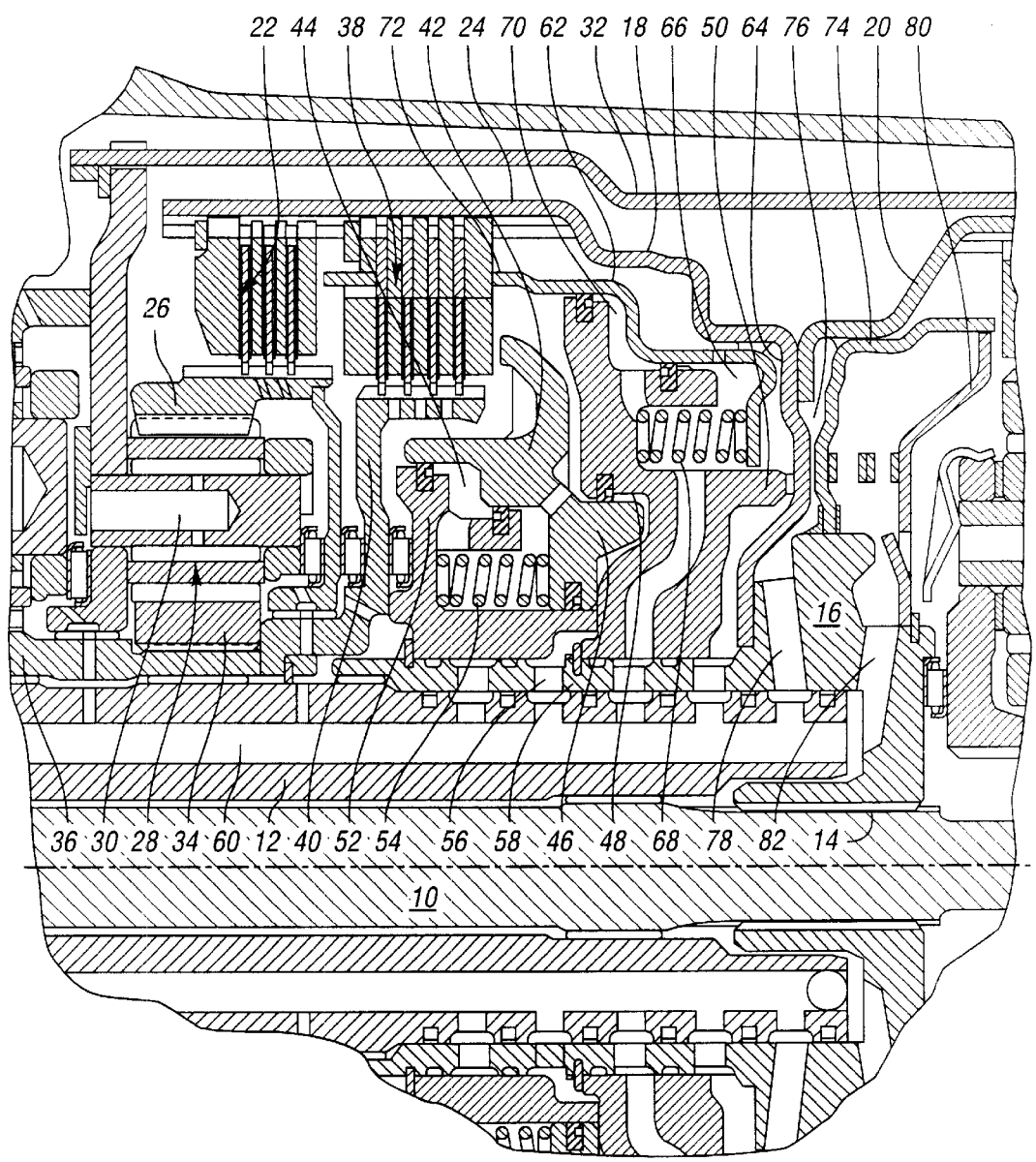
FIG. 1 is a cross-sectional view of a portion of an automatic transmission mechanism, which includes the rotary clutch assembly of the invention.

FIG. 1 shows a partial cross-sectional view of a power transmission mechanism including rotary clutch assemblies for controlling the torque flow paths defined by planetary gear elements. A torque input shaft 10 extends through a stationary sleeve shaft 12. Torque input shaft 10 is splined at 14 to a clutch hub 16. A cylinder member 18 is secured to the hub 16, and a companion cylinder 20 is joined to the cylinder 18. Cylinder 20 forms a part of a direct clutch assembly, and cylinder 18 forms a part of a forward clutch assembly and a reverse clutch assembly. The forward clutch assembly which is shown at 22, has clutch disc separator plates externally splined to an internally splined portion 24 of the cylinder 18. Internally splined friction discs of the forward clutch 22 are splined to ring gear 26 of a forward-drive planetary gear unit 28.

The carrier 30 for the gear unit 28 is connected to torque transfer member 32. Sun gear 34 for the gear unit 28 is connected to sun gear sleeve shaft 36, which is journalled on the stationary sleeve shaft 12.

A reverse clutch assembly 38 comprises clutch separator plates splined to the cylinder 24 and clutch discs splined to clutch member 40, which is secured to sleeve shaft 36.

Reverse clutch assembly 38 includes an annular cylinder member 42, which defines a clutch pressure release chamber 44 and a clutch apply piston 46. The annular piston 46 is received in an annular cylinder 48 defined by rotary clutch member 50. Release chamber 44 is defined in part by clutch member 52. A series of compression springs 54 is located in the annular cylinder 44 to normally urge the piston member 42 to a clutch release position.

Pressure is distributed to annular cylinder 48 through a pressure port 56 in sleeve shaft 58. Shaft 58 is journalled on stationary sleeve shaft 12. A series of pressure passages is located in sleeve shaft 12 to supply pressurized fluid to the various pressure chambers of the rotating clutch assembly, the passages in sleeve shaft 12 being generally indicated at 60. The clutch member 52 and the clutch member 50 are held axially fast by snap rings on the sleeve shaft 58.

An annular piston member 62, received in annular cylinder 64, defines a clutch-apply chamber 66. A compression spring 68 situated between clutch member 50 and piston member 62 urges the piston member 62 normally in a right-hand direction, as viewed in FIG. 1.

The piston member 62 cooperates with the clutch member 50 to define a clutch release chamber 70. The piston member 62 includes axially extending portion 72, which engages the forward clutch 22. Piston portion 72 extends through openings (not shown) formed in the clutch separator plates of the clutch assembly 38. The cylinder 20 for the direct-drive clutch assembly, together with annular piston 74, defines an annular pressure chamber 76. As pressure is distributed to chamber 76, piston 74 will be urged into direct-drive clutch engagement. The clutch hub 16, to which the cylinders 18 and 20 are connected, is provided with a pressure supply passage 78.

A fluid pressure dam 80 is located in the piston 74. It is secured to the clutch hub 16 and is supplied with fluid, usually lubricating oil, through a passage 82.

Figure 1A:
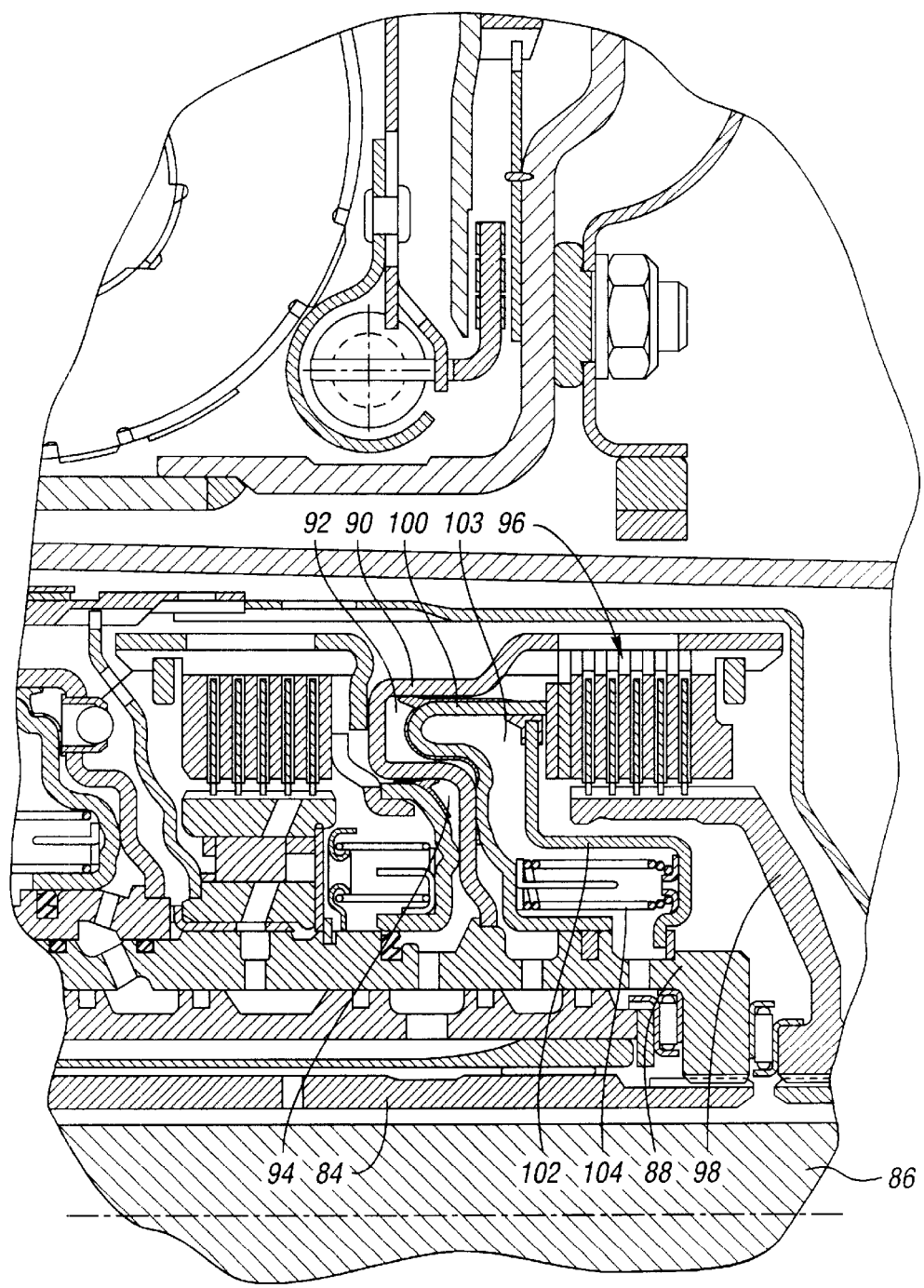
FIG. 1a is a cross-sectional view of a portion of a conventional automatic transmission wherein a conventional centrifugal pressure fluid dam is included to counterbalance the centrifugal pressure buildup in the clutch actuator chamber.

A conventional design for compensating for centrifugal pressure buildup is illustrated in FIG. 1a. This design will be described merely for the purpose of comparison with the design of FIG. 1, which illustrates applicants' dual piston rotary clutch assembly. In the design of FIG. 1a, a torque input shaft 84 surrounds an axle half shaft 86, which is a torque output element of the transmission. The input shaft is connected to clutch sleeve shaft 88.

Annular clutch cylinder member 90 is secured to the sleeve shaft 88. It defines an intermediate ratio clutch chamber 92 and a direct-drive clutch chamber 94. An intermediate clutch assembly 96 includes externally splined separator plates drivably connected to cylinder 90 and internally splined friction discs secured to intermediate clutch assembly output shaft 98. An annular piston 100 located in the cylinder 90 cooperates with the cylinder to define the pressure chamber 92.

The clutch assembly 96 is applied by a piston force developed by the pressure in the chamber 92. A centrifugal pressure dam 102 is secured to the sleeve shaft 88 to create a centrifugal pressure balance chamber 103 on the right-hand side of the piston 100 as the piston assembly rotates. Piston return spring 104 urge the piston in a left-hand direction, which tends to release the clutch when pressure is relieved from clutch chamber 92.

The dual piston characteristic of the design of FIG. 1 makes it possible to obtain clutch gain adjustments and gear ratio change using a single clutch. This is accomplished without the necessity for using a dedicated centrifugal pressure balance dam of the kind shown at 102 in the conventional design of FIG. 1a.

Figure 3:
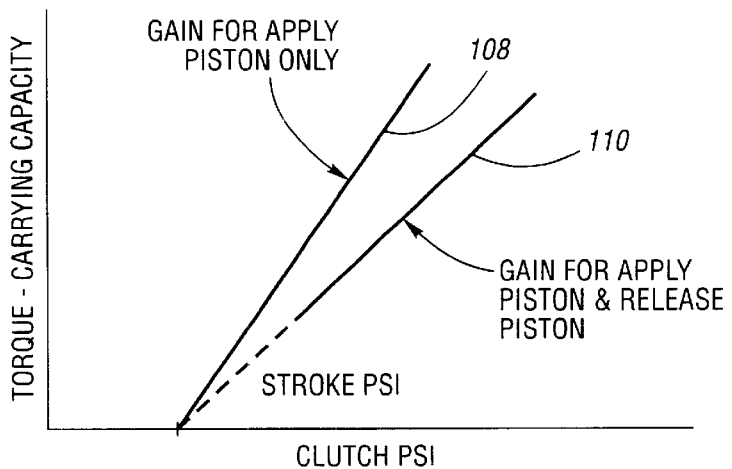
FIG. 3 is a plot of torque-carrying capacity versus clutch pressure, which illustrates a high clutch gain when only the apply cylinder is pressurized and a lower gain when both the apply chamber and the release chamber are pressurized.

The clutch gain characteristic of the design of FIG. 1 is shown in FIG. 3. In FIG. 3, the linear plot 108 shows the gain when pressure chamber 64 is pressurized with a command pressure and when no command pressure is distributed to the pressure chamber 70. The slope, or gain, of the plot 108 is substantially greater than the slope, or gain, of plot 110, which illustrates the gain for the rotary clutch assembly when both pressure chambers 66 and 70 are pressurized.

During rotation of the clutch assembly, the sealed rotating clutch assembly apply chamber will produce an apply force determined by the chamber geometry. This apply force is expressed as follows:

$$F = \frac{w*\omega^2*A}{g} * \left(\frac{R_0^2 + R_i^2}{4} - \frac{r_i^2}{2}\right)$$

where:

$F$ = apply force (lbs.)

$\omega$ = rotational speed (rad/sec)

$g$ = gravitational constant (386.4 in/sec$^2$)

$A$ = piston apply area = $(\pi * (R_0^2 - R_i^2))$(in.$^2$)

$R_0$ = Apply piston O.D. (in.)

$R_i$ = Apply piston I.D. (in.)

$ri$ = Radius where oil starts to rotate (in.)

It is possible to determine a so-called dimensional balance coefficient for the rotating clutch chamber. This dimensional balance coefficient depends upon the radii of the chambers and the area of the piston loaded by the clutch chamber pressure. The dimensional balance coefficient (x) is expressed as follows:

$$x = (R_0^2 - R_i^2) * [(R_0^2 + R_i^2)/4 - (r_i^2/2)]$$

The dual piston rotary clutch construction of the invention uses both the apply and release chambers for gain adjustment. When the apply pressure only is pressurized, as explained previously, a higher gain is achieved compared to the gain that would be available when both the apply and release chambers are fed with the same clutch apply pressure.

In practicing the invention, the radius of the release chamber is adjusted such that approximately 100 percent centrifugal balance is achieved while maintaining an apply area and release area relationship for any given gain adjustment. It is possible, by adjusting the area and radial dimension relationship of the release area and the apply area, to attain a dimensional balance coefficient for the release area that matches the dimensional balance coefficient for the apply area. An example of a relationship between the dimensional characteristics of the apply and release areas which will achieve centrifugal balance is illustrated as follows:

Apply: $R_0$=2.244 $R_i$=1.508 $r_i$=1.047 inches (A=$\pi$*(2.244$^2$−1.508$^2$)=8.678 in$^2$)

Release: $R_0$=2.658 $R_i$=2.394 $r_i$=1.047 inches (A=$\pi$*(2.658$^2$−2.394$^2$)=4.192 in$^2$)

The clutch that has the dimensional characteristics indicated above is 100 percent centrifugally balanced because the dimensional balance coefficients for each chamber equals:

$$(R_0^2 - R_i^2) * [(R_0^2 + R_i^2)/4 - (r_i^2/2)] = 3.54$$

Figure 2:
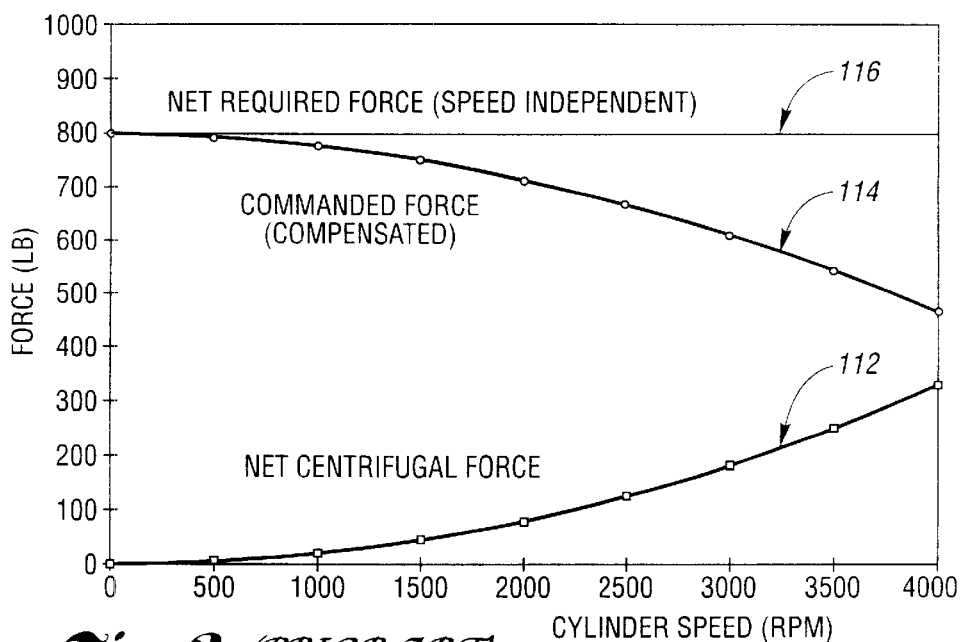
FIG. 2 is a plot showing cylinder speed versus piston force for a conventional balanced rotating clutch.

FIG. 2 is a plot that illustrates the conventional relationship between the piston-apply force required by the rotating clutch assembly, the commanded force obtained by pressurizing the clutch chambers with a measured commanded pressure, and the net centrifugal force acting on the fluid in the chambers. At any given cylinder speed in the relationship shown in FIG. 2, there will be a commanded force; which, when combined with the net centrifugal force, will achieve a net required force that is speed independent. The net centrifugal force plot is shown at 112. The compensated commanded force plot is shown at 114. The sum of the forces represented by plots 112 and 114 at any given cylinder speed will be a constant value, which is the speed independent net required force shown at 116.

Figure 2A:
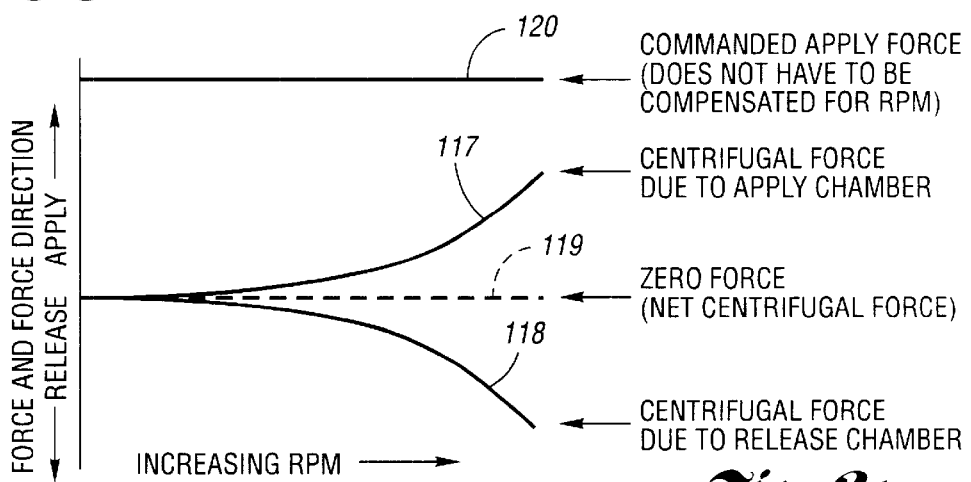
FIG. 2a is a plot showing the cylinder speed versus piston force for the balanced rotating clutch assembly of the invention.

In contrast to the plot of FIG. 2, which shows conventional clutch pressure relationships, the plot of FIG. 2a shows the relationship between centrifugal apply and release forces for the clutch assembly of the invention. Apply force is shown at 117. Even though the release chamber's piston area is different fro that of the apply chamber for clutch gain adjustment, its centrifugal balance coefficient (discussed previously) can be made exactly equivalent to that of the apply chamber. The release chamber's release force shown at 118 exactly cancels the apply force 117, resulting in zero net centrifugal force shown at 119 at any rpm. Commanded apply force, shown at 120, does not have to be compensated for rpm.

The dual piston feature of the rotary clutch assembly of the invention eliminates the centrifugal imbalance that results in an input speed-squared dependent apply force when control pressure is held constant. If the clutch assembly were to be unbalanced, the clutch return spring force, of necessity, would be designed with a high spring rate to ensure that the clutch will not "drift on"0 when it should be released. Further, if the clutch is under-balanced and the properly designed return spring force is used, the clutch stroke pressure would be reduced as the clutch speed increases. By practicing the invention, it is possible to maintain a consistent clutch stroke pressure. The invention thus makes it feasible to design a control system that can be calibrated for good shift quality since clutch stroke pressure is not dependent upon acceleration rates.

By computing an equivalent centrifugal apply pressure, which is equal to the net centrifugal apply force divided by the apply piston area, it is possible to calculate the percent balance for the rotating clutch assembly. The net centrifugal force is equal to the apply force minus the balance force. The percent balance can be expressed by the following equation:

$$\text{Balance \%} = \left(1 - \frac{\text{Equivalent Centrifugal Apply Pressure}}{\text{Max. Required Clutch Control Pressure}}\right) * 100\%$$

The dimensional characteristics of the rotating clutch assembly of the invention can be designed so that the balance percentage is greater than approximately 90 percent.

Although an embodiment of the dual piston rotary clutch assembly of the invention has been disclosed, it will be apparent to persons skilled in the art that modifications may be made without departing from the scope of the invention. All such modifications and equivalents thereof are intended to be covered by the following claims.

What is claimed is:

1. A rotary, pressure-actuated clutch assembly for a multiple-ratio power transmission mechanism comprising a torque input shaft;

gearing defining torque flow paths from the torque input shaft to a driven element;

a first rotary clutch member defining an annular clutch-apply pressure cylinder, a clutch-apply piston in the clutch-apply pressure cylinder defining an apply pressure chamber;

a second rotary clutch member in the clutch-apply piston;

the second rotary clutch member and the clutch-apply piston defining a clutch-release pressure chamber;

a clutch return spring between the second rotary clutch member and the clutch-apply piston urging the clutch-apply piston to a clutch released position;

the clutch release pressure chamber and the clutch apply pressure chamber each having a dimensional centrifugal balance coefficient expressed as:

$$(R_0^2 - R_i^2) * [(R_0^2 + R_i^2) \div 4 - (r_i^2 \div 2)]$$

where:

$R_0$ = piston outside diameter $R_i$ = piston inside diameter $r_i$ = radius at which oil starts to rotate; the balance coefficient for the release pressure chamber being approximately equal to the balance coefficient for the apply pressure.

2. A rotary, pressure-actuated clutch assembly with a dual gain characteristic as torque is transferred from a clutch torque input member to a clutch torque output member;

the clutch assembly comprising a first rotary clutch member defining an annular clutch-apply pressure cylinder, a clutch-apply piston in the clutch-apply pressure cylinder defining a clutch apply pressure chamber;

a second rotary clutch member in the clutch-apply piston;

the second rotary clutch member and the clutch-apply piston defining a clutch release pressure chamber;

a clutch return spring between the second rotary clutch member and the clutch apply piston urging the clutch-apply piston to a clutch released position;

fluid pressure passage means in the clutch assembly for distributing selectively clutch actuating pressure to the pressure chambers whereby the clutch assembly has a high gain when the clutch apply pressure only is pressurized and a lower gain when both the clutch apply pressure chamber and the clutch release pressure chamber are simultaneously pressurized;

the clutch release pressure chamber and the clutch apply pressure chamber each having a dimensional centrifugal balance coefficient expressed as:

$$(R_0^2 - R_i^2) * [(R_0^2 + R_i^2) \div 4 - (r_i^2 \div 2)]$$

where:

$R_0$ = piston outside diameter $R_i$ = piston inside diameter $r_i$ = radius at which oil starts to rotate; the balance coefficient for the release pressure chamber being approximately equal to the balance coefficient for the apply pressure.

3. The rotary, pressure-actuated clutch assembly set forth in claim 1 wherein centrifugal pressure forces developed in the clutch-apply pressure cylinder and in the clutch-release pressure chamber are equal to:

$$F = \frac{w * \omega^2 * A}{g} * \left( \frac{R_0^2 + R_i^2}{4} - \frac{r_i^2}{2} \right)$$

Where:

$F$ = apply force (lbs.)

$\omega$ = rotational speed (rad/sec)

$g$ = gravitational constant (386.4 in/sec²)

$A$ = piston apply area = $(\pi * (R_0^2 - R_i^2))$(in.²)

$R_0$ = Apply piston O.D. (in.)

$R_i$ = Apply piston I.D. (in.)

$ri$ = Radius where oil starts to rotate (in.).

4. The rotary, pressure-actuated clutch assembly set forth in claim 2 wherein centrifugal pressure forces developed in the clutch-apply pressure cylinder and in the clutch-release pressure chamber are equal to:

$$F = \frac{w * \omega^2 * A}{g} * \left( \frac{R_0^2 + R_i^2}{4} - \frac{r_i^2}{2} \right)$$

Where:

$F$ = apply force (lbs.)

$\omega$ = rotational speed (rad/sec)

$g$ = gravitational constant (386.4 in/sec²)

$A$ = piston apply area = $(\pi * (R_0^2 - R_i^2))$(in.²)

$R_0$ = Apply piston O.D. (in.)

$R_i$ = Apply piston I.D. (in.)

$ri$ = Radius where oil starts to rotate (in.).

5. The rotary, pressure-actuated clutch assembly set forth in claim 1 wherein the dimensional balance coefficient for the release pressure chamber is at least 90 percent of the dimensional balance coefficient for the apply pressure chamber.

6. The rotary, pressure-actuated clutch assembly set forth in claim 2 wherein the dimensional balance coefficient for the release pressure chamber is at least 90 percent of the dimensional balance coefficient for the apply pressure chamber.

* * * * *